United States Patent [19]

Fecik et al.

[11] Patent Number: 4,737,182

[45] Date of Patent: Apr. 12, 1988

[54] GLASS SHEET PRESS SUPPORT AND ALIGNMENT SYSTEMS

[75] Inventors: Michael T. Fecik, Pittsburgh; Joseph C. Pavlik, Natrona Heights; John J. Ewing, Tarentum, all of Pa.

[73] Assignee: PPG Industries, Inc., Pittsburgh, Pa.

[21] Appl. No.: 941,112

[22] Filed: Dec. 12, 1986

[51] Int. Cl.⁴ ............................................. C03B 23/03
[52] U.S. Cl. ...................................... 65/106; 65/102; 65/273; 65/275; 65/323
[58] Field of Search ................. 65/102, 106, 273, 275, 65/323, 374.11

[56] References Cited

U.S. PATENT DOCUMENTS

| | | | |
|---|---|---|---|
| 2,966,006 | 12/1960 | Sherts et al. | 65/323 |
| 3,265,484 | 8/1966 | Ritter, Jr. | 65/106 X |
| 4,290,796 | 9/1981 | Reese et al. | 65/287 |
| 4,526,605 | 7/1985 | Frank et al. | 65/273 |

*Primary Examiner*—Arthur Kellogg
*Attorney, Agent, or Firm*—Andrew C. Siminerio

[57] ABSTRACT

A pair of generally vertically aligned press bending molds are slidably mounted relative to each other. An alignment pin extends into alignment holes in the upper and lower molds when the molds are vertically aligned. Adjusting screws positioned around the periphery of each mold, contact and bias each mold in a desired direction so as to precisely align the upper mold relative to the lower mold.

16 Claims, 2 Drawing Sheets

GLASS SHEET PRESS SUPPORT AND ALIGNMENT SYSTEMS

BACKGROUND OF THE INVENTION

1. Field of the Invention

This invention relates to press bending, and in particular to a press face support and alignment system for press bending hot glass sheets.

2A. Technical Considerations

Press bending is a well known forming technique used to shape heat softened sheet materials, and in particular glass sheets. In general, flat sheet material is conveyed through a furnace and heated to its heat softening temperature. The sheet is then conveyed between a pair of vertically aligned upper and lower pressing molds and sandwiched between the molds to impart the final desired shape to the sheet. In a press bending arrangement as taught in U.S. Pat. No. 4,526,605 to Frank et al., the sheet is conveyed by conveyor rolls over a lower slotted pressing mold that lifts the sheet off the rolls and into contact with a full surface upper vacuum mold. The lower mold thereafter retracts while the upper mold holds the sheet thereagainst by vacuum. The sheet is thereafter deposited on a tempering ring positioned below the sheet after shaping and transported to a quench station where it is cooled to impart a temper in the shaped glass sheet. In a press bending arrangement as taught in U.S. Pat. No. 4,290,796 to Reese et al., overlaying glass sheets are preliminarily shaped by gravity on an outline mold by conveying them through a heating lehr. The outline mold is then positioned in a shaping station wherein a full surface lower mold passes through the outline mold to lift and press the glass sheets against a full surface upper mold. After shaping the lower mold deposits the shaped glass sheet back onto the outline mold for further processing.

As the bent shape of glass sheets becomes more complex due to the emphasis placed on increasingly aerodynamic automotive and aircraft designs, it is very important that the pressing faces of the shaping mold maintain proper alignment. Any small misalignment which may occur during the pressing operation may result in a defectively shaped glass sheet that will be rejected.

In addition, with the great variety of shapes and patterns required by users of shaped glass sheets, many different sets of molds must be utilized. Each time a different curved shape is required, the current set of molds must be removed and replaced with a new set that must be positioned and aligned prior to restart of the press bending operation.

It would be advantageous to have a press bending arrangement wherein the relative positions of the upper and lower mold may be easily and accurately checked to ensure that the molds are properly aligned, as well as provide an aligning arrangement to quickly realign the molds if required. In addition, it would be advantageous to have a mold mounting arrangement that allows for quick replacement and realignment of the mold in a press bending operation.

2B. Patents of Interest

U.S. Pat. No. 4,290,796 to Reese et al., teaches a mold alignment arrangement for a glass sheet shaping apparatus. Outline molds support glass sheets as the molds are conveyed through a heating lehr and bent by gravity sagging. The outline mold stops at a shaping station in approximate alignment between a pair of upper and lower vertically aligned pressing molds. As the outline mold enters the shaping station, pin members at the end of rods move inward from the side walls of the lehr to engage J-shaped members in the outline mold to align the outline mold relative to the pressing molds. In addition, the upper and lower pressing molds are each provided with two pairs of elongated slots; a first pair extending longitudinally along a longitudinal reference line and second pair extending along a transverse reference line. The slots are arranged so that the longitudinal reference line which connects the first pair of slots interconnects the transverse reference line connecting the second pair of slots at the geometric center of the mold. The pins within the slots maintain the geometric center at a fixed location at all times despite any change in temperature of the mold during operation.

U.S. Pat. No. 4,526,605 to Frank et al., discloses a press bending operation wherein an upper vacuum mold for shaping glass sheets includes vertical side walls with an inwardly extending circumferential ledge which supports a corresponding outwardly extending ledge of a vacuum mold press face. The press face is supported by the support structure without any metal attachments that may induce high local stresses. A vertical wall of the support structure can be removed to permit replacement of the vacuum press face.

The art discloses various press bending arrangements but does not teach or disclose techniques for adjusting, aligning and realigning pressing molds to ensure accurately bent glass sheets.

SUMMARY OF THE INVENTION

An object of this invention is to provide a sheet shaping apparatus having adjustably mounted upper and lower shaping molds. The molds may be adjusted so as to precisely align the upper mold relative to the lower mold. The upper mold includes an outwardly extending peripheral ledge slidably supported on an inwardly extending peripheral ledge of a supporting box member. Adjusting screws extend through the box member and are positioned about the periphery of the outwardly extending ledge in abutting relation thereto. The screws may be tightened and loosened, as required, to bias the upper mold in a desired direction. The lower mold is slidably mounted on a support plate including stop members positioned around and spaced from the periphery of the lower mold. Adjusting screws extend through the stop members and abut an edge portion of the lower mold. As with the adjusting screws in the upper mold, the adjusting screws in the lower mold may be tightened and loosened, as required, to bias the lower mold in a desired direction. The upper and lower molds each include at least one hole in a portion adjacent the shaping surface of each mold such that when the upper and lower molds are precisely aligned, i.e., one vertically below the other, a pin member positioned within the hole in the lower mold will simultaneously extend into the hole in the upper mold when the molds are in a sheet pressing position relation to each other. The molds may also be manually aligned and thereafter held in place by tightening the adjusting screws.

The mold support and alignment arrangement of the present invention provides a relatively simple and accurate means to vertically align a set of shaping molds after initial installation and to recheck the alignment during operation. In addition, the arrangement allows for relatively simple replacement of upper and lower mold sets for different pressing operations.

DETAILED DESCRIPTION OF THE INVENTION

The present invention is presented with respect to a horizontal press bending arrangement using full surface press faces but it should be appreciated that the invention may be used in any pressing operation where alignment of a mold is critical or where the alignment of a mold should be checked with a minimal interference to the press bending operation.

Figure 1:
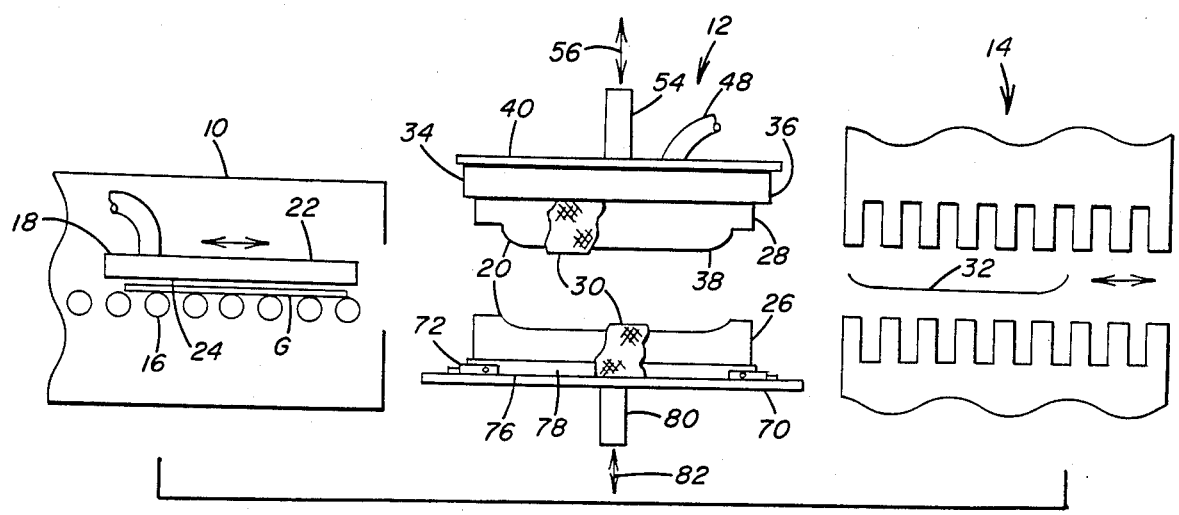
FIG. 1 is a side schematic view of a glass sheet press bending arrangement incorporating the present invention.

FIG. 1 is a schematic of a press bending operation and includes a furnace 10, shaping station 12, and quench station 14. Transversely extending conveyor rolls 16 convey a glass sheet G through the furnace 10 where it is heated to its heat softening temperature. A transfer device 18 engages the sheet G within the furnace 10 and transfers it to the pressing station 12 adjacent to furnace 10. The shaping station 12 includes a pair of vertically aligned upper and lower pressing molds 20. It should be appreciated that if required the pressing station may be included within the furnace 10 or in a separately heated chamber.

The pickup 18 moves the glass sheet and positions it relative to the bending molds 20. Although not limited in the present invention, the particular embodiment illustrated in FIG. 1 utilizes a shuttling vacuum pickup 22. The pickup 22 is positioned at the exit end of furnace 10 where it pulls a vacuum to draw a glass sheet against its sheet engaging surface 24. The pickup 22 then travels to a position between the molds 20 where it terminates the vacuum and deposits the heat softened glass sheet onto a lower full face pressing mold 26. The pickup 18 thereafter moves out from between the molds 20 i.e., either back into the furnace 10 or to a position adjacent the shaping station 12, and the lower mold 26 moves vertically upward to press the glass sheet G against an upper full face pressing mold 28 vertically aligned above the lower mold 26. It should be appreciated that other transfer devices may be used to convey the heat softened glass sheet from the furnace 10. For example, in the press bending arrangement taught in U.S. Pat. No. 4,526,605 to Frank et al., a high speed conveyor run out may be employed to remove the glass sheets from the furnace and position them in the shaping station 12.

The molds 26 and 28 have complementary glass sheet engaging surfaces corresponding to the final desired shape of the glass sheet to be shaped. A flexible refractory cover 30 may be used to cover the molds and protect the glass sheet G from marking during the pressing operation. The upper mold 28 may be a vacuum mold so that when the molds 26 and 28 separate, the shaped glass sheet G may be held against the upper mold 28 by the vacuum.

After pressing, a tempering ring 32 is thereafter positioned between the molds 26 and 28 to receive the shaped glass sheet from the upper mold 28. The vacuum in the upper mold 28 is discontinued and the glass sheet G drops onto the tempering ring 32 which then conveys the glass sheet G into a first zone of the quench station 14 where it is rapidly cooled to impart a temper therein.

Figure 3:
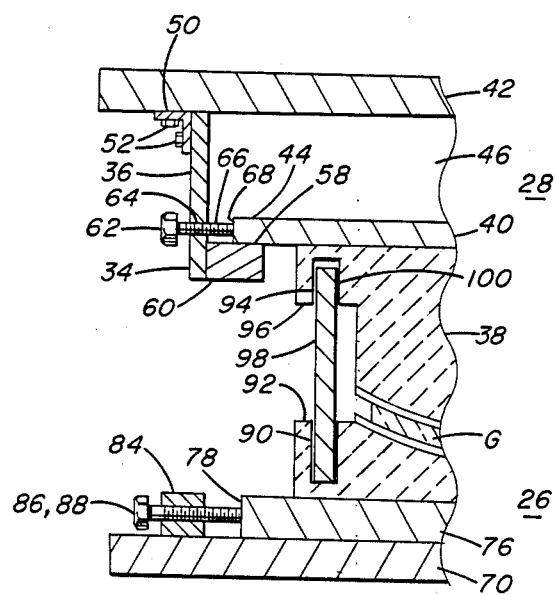
FIG. 3 is a partial cross-section of the mold in pressing engagement with a glass sheet, showing the alignment arrangement.
Figure 2:
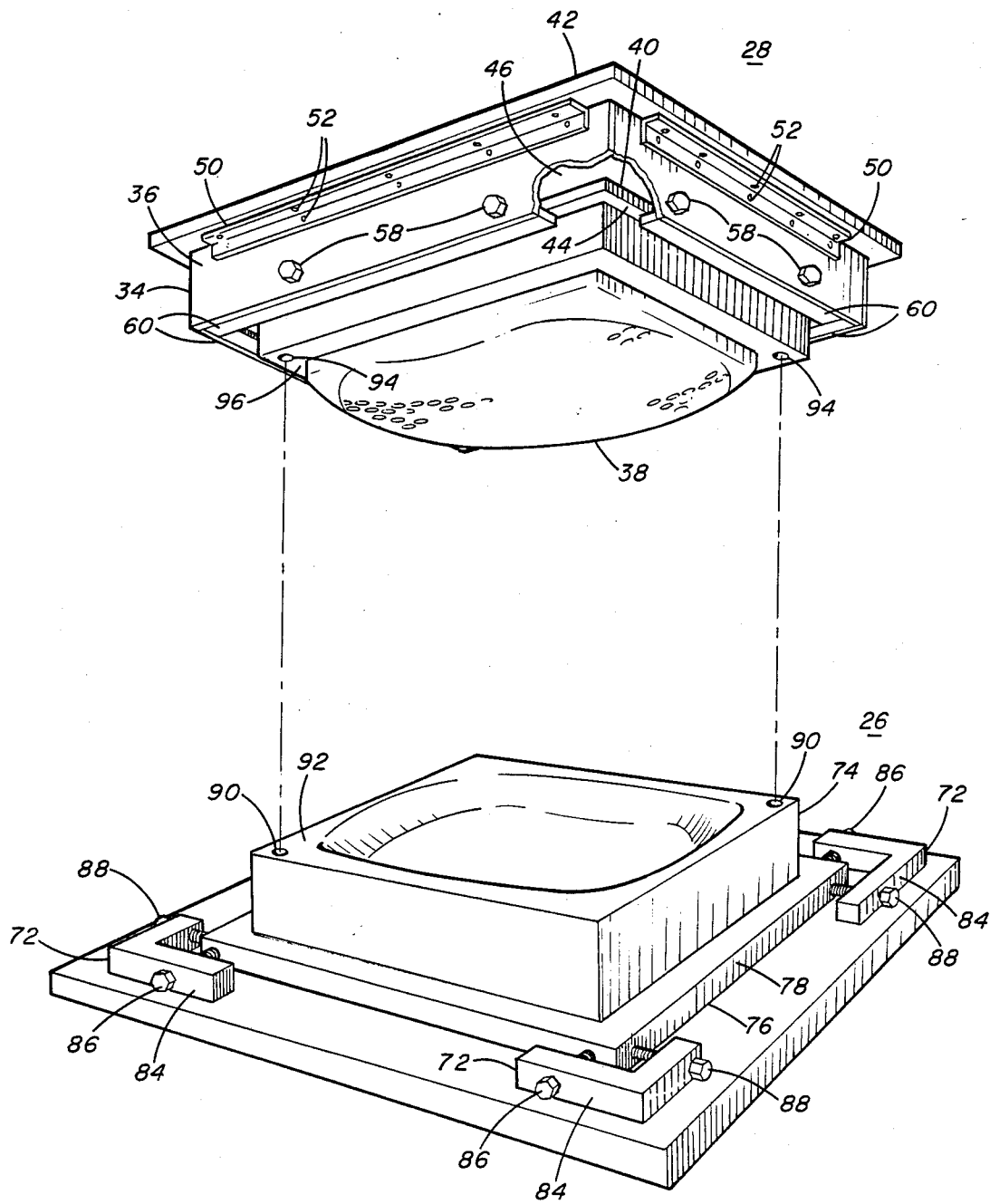
FIG. 2 is a isometric view of the upper pressing mold and lower pressing mold constructed in accordance with the present invention.

Referring to FIGS. 2 and 3, the upper mold 28 includes an inverted metal box 34 having an upper metal wall members 36 and an apertured shaping member 38 with a mounting plate 40 and main support plate 42. The mounting plate 40 provides an outwardly extending ledge portion 44. The metal wall members 36, support plate 40, and mounting plate 42 form a chamber 46 that communicates with a vacuum source (not shown) through an evacuation tube 48 (shown in FIG. 1 only) and a suitable valve (not shown). A plurality of angle irons 50 are spaced along the longitudinal and transverse side edges of the upper metal wall member 36. Each angle 50 has a vertical flange fixed to the upper portion of the metal wall members 36 by bolts 52 and a horizontal flange attached to the mounting plate 42. The mounting plate 42 is suitably connected to an upper vertical piston 54 and supporting frame (not shown) to move the upper mold 28 in a vertical direction as indicated by arrow 56.

An inwardly extending circumferential ledge 58 having longitudinally extending side ledge portions interconnected by transversely extending end ledge portions extends inwardly from the lower portions of the wall members 36. Preferably, the ledge 58 is composed of abutting metal bars 60 fixed to the wall portions 42 in any convenient fashion such as welding, bolting, etc., to provide a rigid supporting surface for the ledge portion 44 of the shaping member 38 of the upper mold 28. The preferred ledge 58 is constructed and arranged to provide an inwardly extending support that supports the outwardly extending ledge portion 44 of the shaping member 38 in partially overlapping relation to permit room for movement of the shaping member 38 within the metal box 34.

The upper mold 28 further includes a plurality of alignment screws 62 extending through internally threaded recesses 64 of the metal wall members 36. Ends 66 of the screws 62 abut edge 68 of the ledge 44 of shaping member 38 to adjust the position of the shaping member 38 of upper press mold 28 in a plane generally perpendicular to the vertical movement direction of the upper mold 28 and maintain the adjusted position in a manner to be discussed later.

Referring to FIGS. 2 and 3 the lower full face pressing mold 26 includes a main support plate 70 having a plurality of lower mold alignment assemblies 72 to receive a lower shaping member 74. Although not limited in the present invention, the lower shaping member 74 may be mounted on an alignment plate 76 having a peripheral edge 78 that fits within the confines of the alignment assemblies 72. As shown in FIG. 1 the support plate 70 is suitably connected to a lower piston 80 to move the lower mold 26 in a generally vertical direction as indicated by arrow 82.

Although not limiting in the present invention, in the particular embodiment of the invention shown in FIG. 2, L-shaped alignment structures 84 are located in the general vicinity of the corners of the rectangular alignment plate 76. Each structure 84 includes a pair of alignment screws; a first screw 86 which contacts a longitudinal edge of alignment plate 76 and second screw 88 that contacts a transversely extending edge of plate 76. It should be noted that the portion of the edge of the alignment plate 76 adjacent the alignment structure 84 should be sufficiently spaced from the structure 84 so as to allow for adequate adjustment of the lower shaping member 74 in a manner to be discussed later.

As with the alignment screws 62 in upper mold 28, the lower mold adjustment assemblies 72 are capable of holding the alignment plate 76 in position on the support plate 70, as well as providing an adjustment mechanism to move the adjustment plate 76 with the shaping member 74 in a plane generally perpendicular to the vertical movement direction of the lower mold 26. As a result, screws 62 can position shaping members 38 and/or assemblies 72 can position shaping member 74 to their required locations for pressing at the start up of the pressing operation, as well as readjusting their positions to realign the shaping members 38 and 74 relative to each other if any misalignment occurs.

Figure 4:
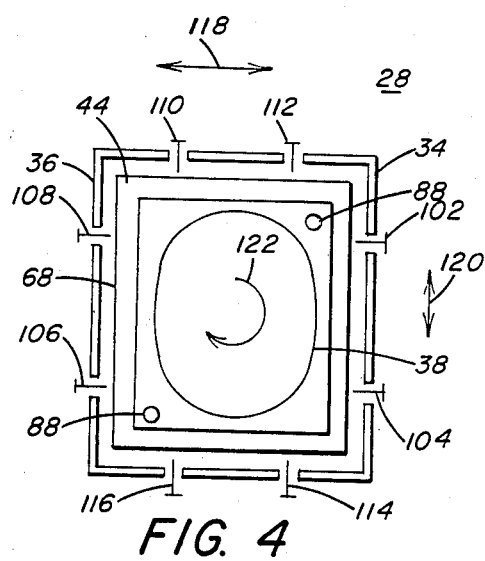
FIG. 4 is a schematic plan view of one particular embodiment of the upper pressing mold showing the position of the aligning screws.

In order to align lower mold 26 with upper mold 28, the lower pressing mold 26 includes a pair of lower positioning holes 90 located in portion 92 of the lower shaping member 74 as shown in FIGS. 3 and 4, and the upper mold 28 includes a pair of upper positioning holes 94 extending through at least a portion of portion 96 of apertured shaping member 38 as shown in FIGS. 2 and 3 and if required, through mounting plate 40. The positioning holes 90 and 94 are aligned such that hole 94 is vertically aligned over hole 90 when shaping member 38 is properly aligned above shaping member 74. Referring specifically to FIG. 3, when the molds are initially installed, each is moved to its pressing position i.e., they are spaced apart a distance equal to the thickness of the sheet of glass to be pressed plus, if required, the thickness of any covers being used on the mold surfaces. A pin 98 is provided in each pair of holes 90 and 94 to ensure that the upper and lower shaping members are in exact vertical alignment with one another. When in position, alignment screws 62 are tightened to hold the apertured shaping member 38 relative to the metal box 34 and screws 86 and 88 are tightened to hold lower shaping member 74 relative to main support plate 70. "Tighten" means turning the adjusting screws so that the inwardly extending ends of the screws 64 in the upper pressing mold 28 move towards edge 68 of the ledges 44 and the inwardly extending ends of screws 86 and 88 of the lower pressing mold 28 move towards edge 78 of alignment plate 76. "Loosen" means turning the screws so that their inwardly extending ends move away from the edges 68 or 78.

After initial start up and periodically throughout the press bending operation, an operator can insert pins 98 in each of the holes 90 of the lower shaping member 74 and move the molds 26 and 28 into pressing position. If the molds are properly aligned, the upper end 100 of each pin 98 will extend into holes 94 of the upper pressing mold 28. If the molds are misaligned, their relative positions must be readjusted so as to properly register each mold relative to the other.

Figure 5:
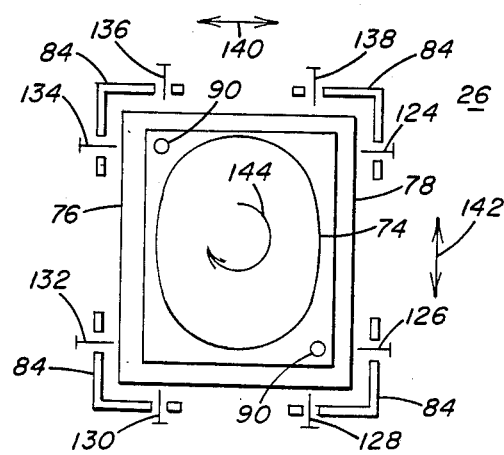
FIG. 5 is a schematic plan view of one particular embodiment of the lower pressing mold showing the position of the aligning screws.

FIGS. 4 and 5 are schematics of the upper and lower mold arrangements shown in FIG. 2. Specifically referring to FIG. 4, in the particular embodiment of the upper mold 28 as illustrated in FIG. 2, adjusting screws 102, 104, 106, and 108 pass through wall member 36 of box 34 and abut the longitudinal portions of the edge 68 of the ledge 44 of mounting plate 40 and screws 110, 112, 114, and 116 pass through vertical wall member 36 and abut the transverse portions of the edge 68 of the ledge 44 of mounting plate 40. In order to translate the apertured shaping member 38 as indicated by arrow 118, screws 102 through 108 are loosened or tightened, as required, to bias member 38 in the proper direction. Similarly, to translate the apertured shaping member 38 in the direction as indicated by arrow 120, screws 110 through 116 are loosened or tightened, as required to bias member 38. To rotate the apertured shaping member 38 about an axis perpendicular to the plane of the lower pressing mold 26 as indicated by arrow 122, screws 102, 106, 110, and 114 are loosened and screws 104, 108, 112, and 116 are tightened.

Referring to FIG. 5 illustrating the particular embodiment of the lower pressing mold 26 shown in FIG. 2, screws 124 through 138 are positioned about the peripheral edge 78 of alignment plate 76. In a manner similar to that previously discussed, screws 124, 126, 132, and 134 are used to bias the lower shaping member 74 in a direction as indicated by arrow 140; screws 128, 130, 136, and 138 are used to bias lower shaping member 74 in a direction as indicated by arrow 142; and all the screws are used to rotate lower shaping member 74 about an axis perpendicular to the plane of the adjusting plate 76 in a direction as indicated by arrow 144.

Figure 6:
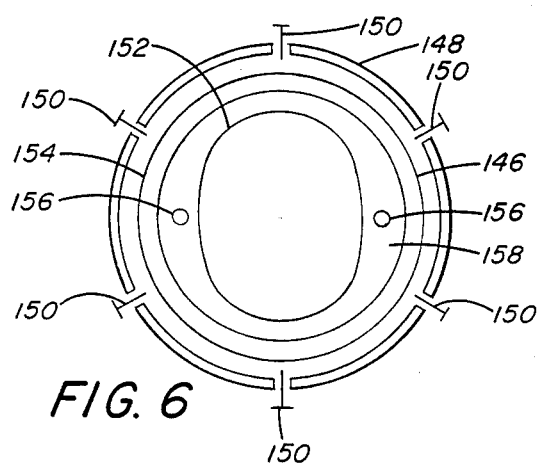
FIG. 6 is schematic plan view of an alternate mold positioning and alignment arrangement.

In light of the teachings of the present invention, it would be apparent to one skilled in the art to use alternate alignment arrangements to reposition the shaping surfaces of the bending molds. For example, the upper mold may be fixed while only the lower mold is adjustable, or visa versa. In addition, lower pressing mold 26 alignment assemblies may be positioned along the longitudinal and transverse edges of the alignment plate 76, or the alignment assembly may be extended around its entire peripheral edge 78. Furthermore, additional alignment screws may be used to hold a mold in place after it has been aligned more securely. Still a further embodiment is schematically illustrated in FIG. 6 showing a circular alignment plate 146 and an alignment assembly 148 extending about its periphery. A plurality of alignment screws 150 extend through wall 152 of the assembly 148 and abut edge 154 of the mounting plate 146. The screws 150 may be used to position a shaping mold 152. Alignment pin holes 156 are positioned in area 158 of the mold 152. In this particular embodiment, the shaping mold 152 is translated and held in place after rotating by loosening and retightening the screws 150.

It is apparent from the teachings of this invention that a variety of different mold shapes and configurations may be easily interchanged and aligned for a press bending arrangement. In addition, mounting plate 40 of the upper mold 28 and alignment plate 76 of the lower mold 26 need not be limited to rectangular configurations. Each may be of any configuration so long as an adjusting arrangement as taught herein is positioned adjacent to and spaced from the edge of the alignment plates so as to allow the alignment screws to translate and secure the mold after it has been moved and rotated to its proper position.

The form of the invention shown and described in this disclosure represents an illustrative preferred embodiment and various modifications thereof. It is understood that various changes may be made without departing from this gist of the invention as defined by the claimed subject matter which follows:

We claim:

1. An apparatus for shaping glass sheets comprising:
   a first shaping member with a first shaping surface;
   means to mount said first member to a first support means;
   a second shaping member with a second shaping surface generally complimentary to and in opposing relation to said first shaping surface of said first shaping member;
   means to mount said second member to a second support means wherein said first and second shaping members are positioned along an orientation axis when said first shaping surface is in registered relation with said second shaping surface;
   means to realign at least one of said shaping members relative to said other shaping member including means to reposition said at least one shaping member relative to said support means of said at least one shaping member in a plane generally normal to said orientation axis such that said first and second shaping surfaces are in registered relation; and
   means to secure said at least one shaping member in said realigned position.

2. The apparatus as in claim 1 wherein said first and second shaping members are a pair of vertically aligned, upper and lower shaping molds.

3. The apparatus as in claim 2 wherein said repositioning means includes upper mold positioning assemblies positioned on said first support means.

4. The apparatus as in claim 3 wherein said first support means includes an upper box having wall members with a peripheral support ledge extending inwardly from said wall members, and said upper mold includes a mounting member with an outwardly extending peripheral ledge overlapping and resting on said inwardly extending support ledge of said upper box, said outwardly extending ledge terminating in spaced relation to adjacent portions of said wall members of said box and said inwardly extending ledge of said box terminating in spaced relation to adjacent portions of said upper mold.

5. The apparatus as in claim 4 wherein said upper mold positioning assemblies include adjusting screws extending through said wall members and spaced around the perimeter of said box, said screws extending into abutting contact with edge portion of said outwardly extending ledge of said mounting member whereby rotation of said screws biases said upper mold in a desired direction and further, wherein said adjusting screws fasten said mounting member in a generally fixed position relative to said upper box.

6. The apparatus as in claim 5 wherein said realigning means further includes lower mold positioning assemblies positioned on said second support means.

7. The apparatus as in claim 6 wherein said lower mold positioning assemblies include alignment screws extending through said positioning assemblies and into abutting contact with edge portions of said lower mold, whereby rotation of said screws biases said lower mold in a desired direction and further, wherein said screws fasten said lower mold in a generally fixed position relative to said second support means.

8. The apparatus as in claim 7 wherein said realigning means includes a first portion adjacent said shaping surface of said upper mold, said first portion having at least one hole for receiving an alignment member, and a second portion adjacent said shaping surface of lower mold, said second portion having a hole vertically aligned below said upper hole to receive said alignment member, wherein said alignment member extends simultaneously into each of said upper and lower holes when said upper mold is properly realigned relative to said lower mold.

9. The apparatus as in claim 8 wherein said upper is a vacuum mold with an apertured shaping surface 10. The apparatus as in claim 1 wherein said realigning means includes a first portion adjacent said first shaping surface of said first shaping member, said first portion having at least one hole for receiving an alignment member, and a second portion adjacent said second shaping surface of said second shaping member said second portion having a hole aligned with said hole in said first shaping member to receive said alignment member, wherein said alignment member extends simultaneously into each of holes when said first shaping member is properly realigned relative to said second shaping member.

11. The apparatus as in claim 3 wherein said realigning means further includes lower mold positioning assemblies positioned on said second support means.

12. The apparatus as in claim 11 wherein said realigning means further includes a first portion adjacent said shaping surface of said upper mold, said first portion having at least one hole for receiving an alignment member, and a second portion adjacent said shaping surface of lower mold, said second portion having a hole vertically aligned below each of said upper holes to receive said alignment member, wherein said alignment member extends into each of said of upper and lower holes when said upper mold is properly realigned relative to said lower mold.

13. A method of aligning molds of an opposing press pair, including first and second molds situated along an orientation axis when said molds are in registered relation, and further including an alignment hole in said first mold generally aligned with a corresponding alignment hole in said second mold, comprising:
   inserting an alignment pin into said alignment hole of said first mold;
   moving said molds relative to each other so as to register said first mold said second mold while
   readjusting the position of at least one of said molds relative to the other mold, wherein said readjusted mold is moved within a plane generally normal to said orientation axis so as to allow said alignment pin to extend simultaneously into both of said alignment holes when said first mold is registered with said second mold;
   securing said at least one of said molds in its readjusted position;
   separating said molds; and removing said alignment pin.

14. The method as in claim 13 wherein said first and second molds are a pair of vertically aligned upper and lower mold and further wherein said moving step includes moving said mold along a generally vertically disposed orientation axis.

15. The method as in claim 14 wherein said adjusting step includes slidably supporting said upper mold from an upper mold support, providing a first set of adjusters around the periphery of said upper mold, biasing selected ones of said first set of adjusters against an edge portion of said upper mold, slidably mounting said lower mold on a lower support platform, providing a second set of adjusters around the periphery of said lower mold, biasing selected ones of said second set of adjusters against an edge portion of said lower mold, and said securing step includes abutting said edge portion of said upper mold with said first set of adjusters and abutting said edge portion of said lower mold with said second set of adjusters.

16. The method as in claim 14 wherein said adjusting step includes slidably supporting at least one of said molds on a mold support, providing adjusters around the periphery of said slidably supported mold, and biasing selected ones of said adjusters against said slidably supported mold to move said upper mold relative to said lower mold until said alignment pin extends simultaneously into said upper and lower holes.

* * * * *

UNITED STATES PATENT AND TRADEMARK OFFICE
CERTIFICATE OF CORRECTION

PATENT NO.   :   4,737,182

DATED        :   April 12, 1988

INVENTOR(S)  :   Michael T. Fecik, Joseph C. Pavlik and John J. Ewing

It is certified that error appears in the above-identified patent and that said Letters Patent is hereby corrected as shown below:

Claim 9 (column 8, line 8), after the word "upper", please insert "mold".

Signed and Sealed this

Twenty-fifth Day of October, 1988

Attest:

DONALD J. QUIGG

Attesting Officer         Commissioner of Patents and Trademarks